US012631534B2

(12) United States Patent
Xiao et al.

(10) Patent No.: US 12,631,534 B2
(45) Date of Patent: May 19, 2026

(54) TEST DEVICE FOR ARBITRARILY DIRECTIONAL COMBINED LOADING AND METHOD FOR USING THE SAME

(71) Applicant: Liaoning University, Shenyang City (CN)

(72) Inventors: Yonghui Xiao, Shenyang City (CN);
Yishan Pan, Shenyang City (CN);
Xiangyu Pan, Shenyang City (CN);
Jianzhuo Zhang, Shenyang City (CN);
Aiwen Wang, Shenyang City (CN);
Lianpeng Dai, Shenyang City (CN)

(73) Assignee: Liaoning University, Shenyang City (CN)

( * ) Notice: Subject to any disclaimer, the term of this patent is extended or adjusted under 35 U.S.C. 154(b) by 358 days.

(21) Appl. No.: 18/354,747

(22) Filed: Jul. 19, 2023

(65) Prior Publication Data

US 2024/0133784 A1 Apr. 25, 2024
US 2024/0230493 A9 Jul. 11, 2024

(30) Foreign Application Priority Data

Oct. 21, 2022 (CN) .......................... 202211296818.3

(51) Int. Cl.
*G01N 3/10* (2006.01)
*G01N 3/06* (2006.01)

(52) U.S. Cl.
CPC ................. *G01N 3/10* (2013.01); *G01N 3/06* (2013.01)

(58) Field of Classification Search
CPC .. G01N 3/02; G01N 3/04; G01N 3/08; G01N 3/10
See application file for complete search history.

(56) References Cited

U.S. PATENT DOCUMENTS 9,423,329 B2 * 8/2016 Takeda ...................... G01N 3/08
11,913,913 B2 * 2/2024 Li ............................. G01N 3/20

FOREIGN PATENT DOCUMENTS

CN 114689437 A * 7/2022 ............. G01N 3/307

OTHER PUBLICATIONS

Xiao et al., Annular Centripetal Static Combined Loading Test Device And Use Method Thereof, Jul. 2022, FIT Machine Translation (Year: 2022).*

* cited by examiner

*Primary Examiner* — Erika J. Villaluna
(74) *Attorney, Agent, or Firm* — Ballard Spahr LLP

(57) ABSTRACT

The present disclosure relates to the technical field of loading test devices, relating to a test device for arbitrarily directional combined loading and a method for using the loading test device. The device includes a test bench base assembly and a loading assembly. The loading assembly is arranged above the test bench base assembly. The loading assembly includes a loading oil cylinder and a swing base. The swing base can rotate with respect to the loading base, such that a direction of the loading oil cylinder can be adjusted to meet requirements of different loading angles. The test bench base assembly includes a first chute, and the loading base is connected to the first chute via a sliding fastening bolt.

10 Claims, 5 Drawing Sheets

TEST DEVICE FOR ARBITRARILY DIRECTIONAL COMBINED LOADING AND METHOD FOR USING THE SAME

CROSS-REFERENCE TO RELATED APPLICATION

This patent application claims priority to Chinese Patent Application No. 202211296818.3 filed with the China National Intellectual Property Administration on Oct. 21, 2022, the disclosure of which is incorporated by reference herein, in its entirety, as part of the present application.

TECHNICAL FIELD

The present disclosure relates to the technical field of loading test devices, and in particular to a test device for arbitrarily directional combined loading and a use method of the loading test device.

BACKGROUND

In the technical field of loading test devices, due to a certain randomness of the object to be tested and the trial and error of research means, the shape of a sample to be tested is not unique, and the direction and magnitude of the required loading load are not necessarily constant. Therefore, in order to reduce the cost of test research, a high-adaptability loading device is needed to achieve the test research of the sample with different angles, different distributions and different magnitudes of loads.

In the research field of coal mine support equipment, in order to test multifaceted performance of impact protection support equipment, it is often necessary to simulate the random dynamic response of wall rocks during the occurrence of impact ground pressure to explore performance parameters of the support equipment. Therefore, it is necessary to analyze the influence law of different pressure incoming directions, positions and sizes on the performance parameters of support equipment. However, static and dynamic loading, different loading loads and loading tests of samples with different sizes can be achieved in the current loading test device, but it is difficult or impossible to carry out tests on arbitrarily different numbers of samples with different angular arrangements and different loading directions. Moreover, due to low adaptability of the loading equipment, a large number of different equipment are needed to meet the research needs in the research process, which is obviously difficult to achieve. Therefore, researchers all choose to simplify the test scheme step by step, but when the simplification is overly idealistic, the results obtained from the research do not have sufficient practical guiding significance.

SUMMARY

The purpose of the present disclosure is to provide a test device for arbitrarily directional combined loading and a method for using the loading test device, so as to overcome one or more defects in the prior art.

A test device for arbitrarily directional combined loading according to the present disclosure includes a test bench base assembly, and a loading assembly, the loading assembly is arranged above the test bench base assembly; the loading assembly includes a loading oil cylinder which is fixedly connected to a swing base via loading fastening screws, and the swing base is arranged on a loading base and forms a relative rotation with respect to the loading base, such that the swing base is rotatable with respect to the loading base, and a direction of the loading oil cylinder is adjusted to meet requirements of different loading angles. The test bench base assembly includes a first chute, the loading base is connected to the first chute via a first sliding fastening bolt, and the first sliding fastening bolt is slidable in the first chute along with the loading base in case the first sliding fastening bolt is not screwed tightly. And the loading assembly further includes a loading rod, the loading rod is integrated with a piston of the loading oil cylinder, a sealing plug is arranged between a port of the loading oil cylinder and the loading rod, and hydraulic oil is injected into the loading oil cylinder to enable the loading rod to extend and retract so as to apply a loading on a sample.

In some embodiments, a swing assembly is arranged between the swing base and the loading base, the swing assembly includes a worm gear, a worm meshed with the worm gear is arranged on one side of the worm gear, the worm is rotationally connected to the swing base, a center of the worm gear is provided with a swing shaft which rotates synchronously, the swing shaft is fixedly connected to the loading base and rotationally connected to the swing base, the worm is rotated to enable the swing base to rotate with respect to the loading base; and the swing assembly is in worm drive, and a situation that the swing base and the loading base are forced to rotate due to a tangential component force brought by an application of a non-centripetal load is avoided by using a unidirectionality of the worm drive.

In some embodiments, a lower part of the swing base is provided with a worm gear groove and a worm groove, the worm gear groove is arranged at a geometric center of the swing base to ensure that the swing base is placed stably, the worm gear is placed in the worm gear groove, and the worm is placed in the worm groove; and a rear end of the worm is provided with a limit mounting block capable of rotating relatively with respect to the worm, and the limit mounting block is arranged in a limit groove and is of a profiled structure, so as to facilitate a mounting of the limit mounting block without falling and ensure that the worm is able to be conveniently mounted in the swing base and rotate relatively with respect to the swing base; a rear tail end of the worm is provided with a worm driving shank, the worm driving shank is an internal hexagon hole formed in a rear end face of the worm, and the worm is driven to rotate via an internal hexagon wrench.

In some embodiments, a swing seal is arranged on an upper surface of the loading base and concentric with the swing shaft, and the swing base is placed on the loading base so as to auxiliary support and seal an internal rotating space; and a swing scale is provided at a rear part of the upper surface of the loading base to measure a rotation angle of the swing base with respect to the loading base, so as to achieve a purpose of accurate adjustment.

In some embodiments, the test bench base assembly is further provided with a second chute, the loading base is connected to the second chute via second sliding fastening bolts, the second chute and the first chute are both of an annular structure, and a diameter of the second chute is larger than a diameter of the first chute.

In some embodiments, a number of the second sliding fastening bolts is two, the second chute is connected to the loading base by arranging the two second sliding fastening bolts in the second chute, the first chute is connected to the loading base by arranging the first sliding fastening bolt in the first chute, and the first sliding fastening bolt and the two second sliding fastening bolts form a triangular structure; and the swing seal is arranged inside the triangular structure formed by the first sliding fastening bolt and the two second sliding fastening bolts, the first sliding fastening bolt and the two sliding fastening bolts are capable of being screwed or unscrewed by rotating the swing base, the triangular structure is provided to improve a stability, such that the loading assembly is capable of bearing a larger reaction force of a loading load, and a space is reserved below the first chute and the second chute to facilitate an operation of screwing/unscrewing the first sliding fastening bolt and the two sliding fastening bolts.

In some embodiments, the loading assembly includes a multiple loading assemblies which are arranged above the test bench base assembly to perform a multidirectional and multi-angle loading test on the sample to be loaded, and an annular scale is provided on an upper surface of the test bench base assembly and on an outer side of the second chute to measure a position of each of the multiple the loading assemblies in a circumferential direction so as to achieve the purpose of accurate adjustment.

In some embodiments, a cover plate is arranged above the multiple loading assemblies, clamping assemblies are arranged below the cover plate, tightening bases are arranged on an outside surface of the test bench base assembly, and the clamping assemblies are mounted on the tightening bases; the clamping assemblies are used to drive the cover plate to move up and down to clamp the multiple loading assemblies so as to further increase a reaction force of a larger loading load that the multiple loading assemblies are able to bear; and each of the clamping assemblies includes a clamping oil cylinder and a clamping rod, the clamping oil cylinder is fixedly connected to a corresponding one of the tightening bases; the clamping rod is fixedly connected to a piston of the clamping oil cylinder, an upper end of the clamping rod is provided with a clamping pin hole, and a pin is inserted into the clamping pin hole to make the clamping rod integrated with the cover plate; a clamping force of the clamping assemblies and an uniformity of the clamping force are improved by mounting the each of the clamping assemblies on the corresponding one of the tightening bases.

In some embodiments, a center of the test bench base assembly is provided with a lifting table, and a lifting oil cylinder is arranged below the lifting table; the lifting oil cylinder is used to drive the lifting table to ascend and descend so as to lift and supplementally restrain the sample to be loaded; and a hydraulic oil pressure in the lifting table is set to adjust a restraint force for the sample to be loaded during the test; and the lifting oil cylinder is controlled by displacement, so as to ascend and descend to a designated position.

In some embodiments, a use method of a test device for arbitrarily directional combined loading is further provided, which includes the following steps.

Selecting a number of the loading assemblies to be used as required, unscrewing the first sliding fastening bolt and the two second sliding fastening bolts, adjusting the first sliding fastening bolt and the two second sliding fastening bolts to respective annular positions according to the annular scale, and then locking the first sliding fastening bolt and the two second sliding fastening bolts, moving the loading assemblies which do not need to be arranged to a non-interference position or removing the loading assemblies which do not need to be arranged;

Inserting the hexagonal wrench into an internal hexagonal hole formed in the rear end face of the worm to drive the worm to rotate, enabling the worm gear not to rotate under a limitation of the swing shaft; enabling the worm to drive the swing base to rotate while rotating, and adjusting the swing base to a required direction according to the swing scale, thus adjusting each of the selected loading assemblies to be used until the adjusting is completed;

Placing the sample to be loaded, starting the lifting oil cylinder, and lifting the sample to an appropriate height to facilitate loading; setting a respective supplemental restraint force for the lifting table as required, and restraining a deformation of the sample in a direction of the lifting table;

Starting the clamping assemblies to drive the cover plate to move downwards for clamping the loading assemblies, setting an appropriate clamping force as required during the clamping, so as to improve the ability of the loading assemblies to resist a reaction force of loading.

Starting the loading assemblies to perform the loading test on the sample, after the loading is completed, controlling the clamping assemblies to drive the cover plate to move upwards, retracting the loading oil cylinder, taking out the loaded sample, and lowering the lifting table to complete a test operation.

Compared with the prior art, the present disclosure has the following beneficial effects:

(1) The swing base capable of rotating with respect to the loading base is provided, such that the direction of the loading oil cylinder can be adjusted to meet the requirements of different loading angles.

(2) The swing assembly is provided between the swing base and the loading base. The swing component is in worm drive, and the situation that the swing base and the loading base are forced to rotate due to the tangential component force brought by the application of a non-centripetal load is avoided by using the unidirectionality of the worm drive.

(3) The loading assembly is connected to the chute via the sliding fastening bolt, thus arbitrary angle adjustment in the circumferential direction can be achieved, and the accurate position guarantee can be achieved by matching the annular scale.

(4) Three sliding fastening bolts are respectively arranged in two annular chutes to form a triangular stable structure, which can guarantee that the loading assembly is free of position deviation during loading under the condition that the position of the loading assembly can be adjusted.

(5) The clamping assembly and the cover plate are provided to further ensure that the position deviation between the loading assembly and the loading oil cylinder is avoided during loading.

(6) The lifting table is provided to play a role of lifting and supplemental restraint role on the sample to be loaded. The hydraulic oil pressure in the lifting table can be set for the setting of the restraint force for the sample to be loaded during the test. Meanwhile, the lifting oil cylinder can be controlled by displacement to ascend or descend to the designated position.

REFERENCE SIGNS

1 test bench base assembly; 101 first chute; 102 second chute; 103 annular scale; 104 tightening base; 105 lifting base; 2 loading assembly; 201 loading oil cylinder; 202 loading rod; 203 sealing plug; 204 loading fastening screw; 205 swing base; 2051 worm gear groove; 2052 worm groove; 2053 limit groove; 206 swing assembly; 2061 worm gear; 2062 worm; 2063 limit mounting block; 207 loading base; 208 swing shaft; 209 swing scale; 210 swing seal; 211 sliding fastening bolt; 3 clamping assembly; 301 clamping oil cylinder; 302 clamping rod; 303 clamping pin hole; 4 cover plate; 5 lifting platform; 501 lifting oil cylinder.

DETAILED DESCRIPTION OF THE EMBODIMENTS

To further understand the contents of the present disclosure, the present disclosure is described in detail with reference to the accompanying drawings and embodiments. It should be understood that the embodiments are only explanatory and not intended to limit the present disclosure.

Embodiment 1

Figure 1:
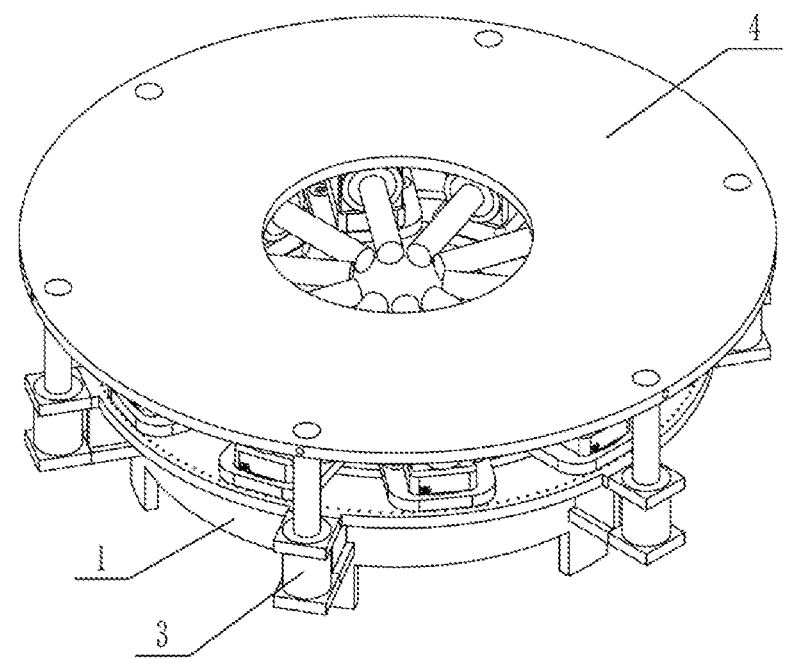
FIG. 1 is a schematic diagram of a three-dimensional structure in accordance with the present disclosure.
Figure 2:
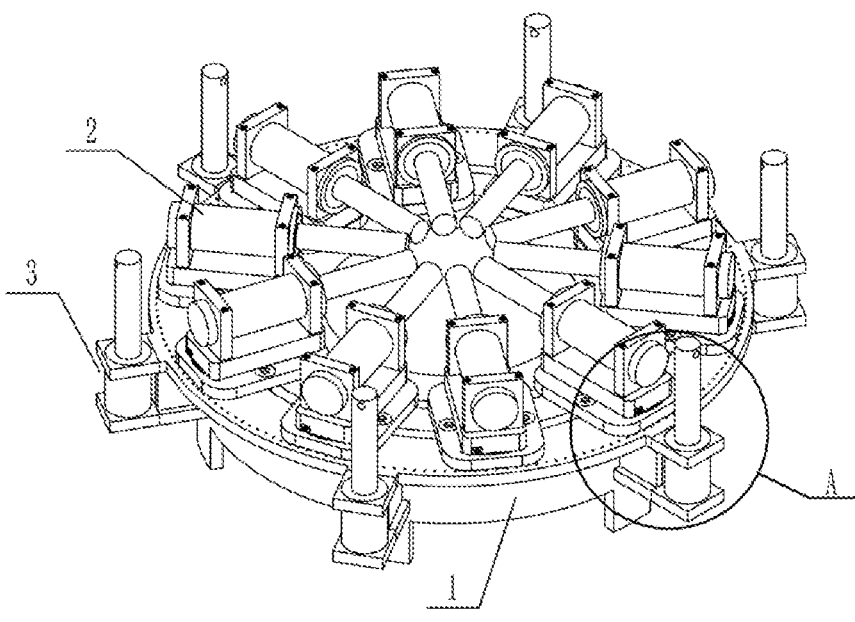
FIG. 2 is a schematic diagram of a three-dimensional structure of FIG. 1 without a cover plate.
Figure 3:
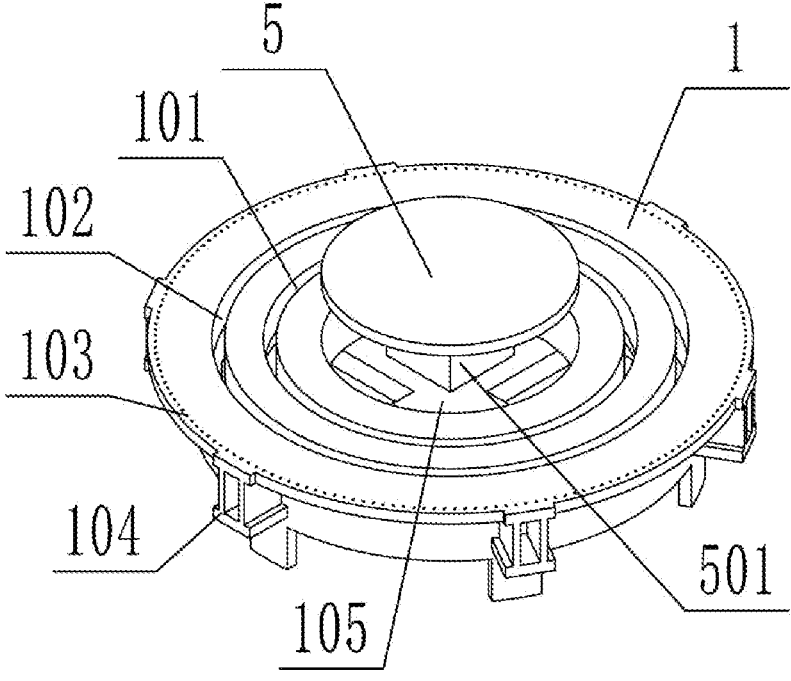
FIG. 3 is a schematic diagram of a three-dimensional structure of a test bench base assembly in accordance with the present disclosure.
Figure 4:
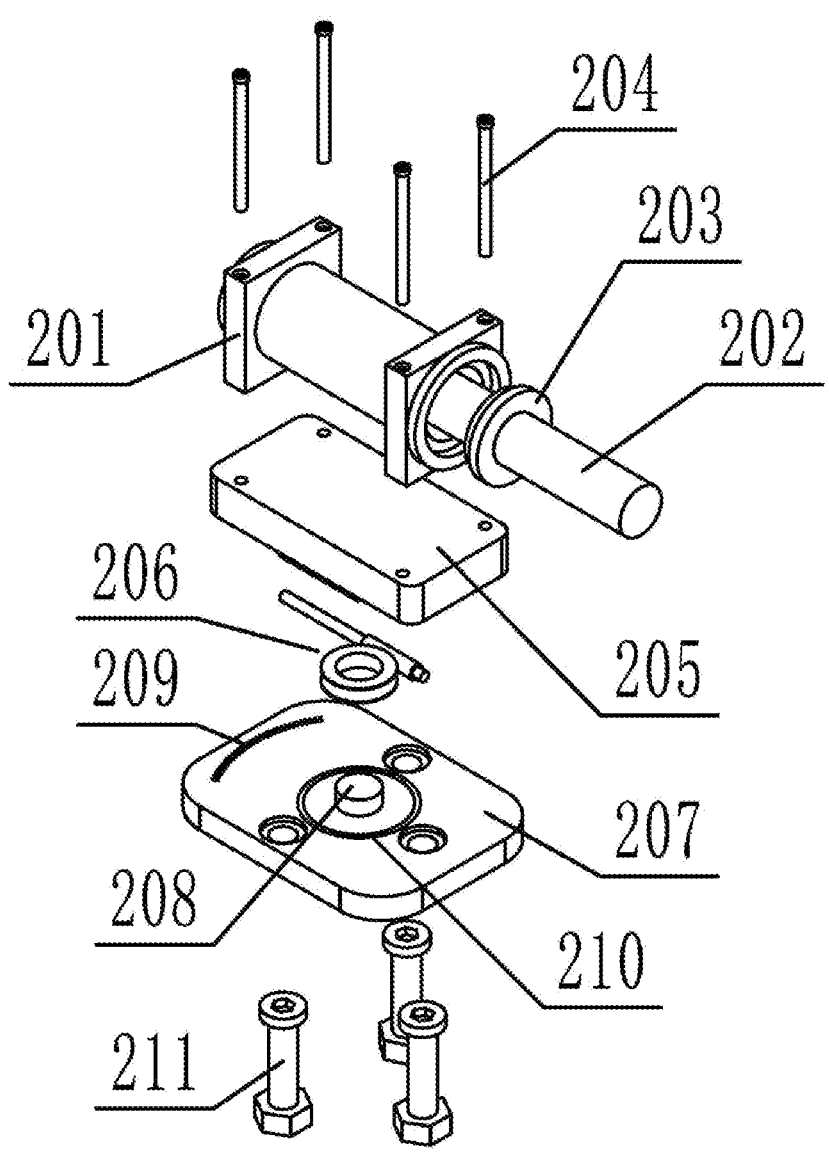
FIG. 4 is a schematic diagram of an exploded structure of a loading assembly in accordance with the present disclosure.
Figure 5:
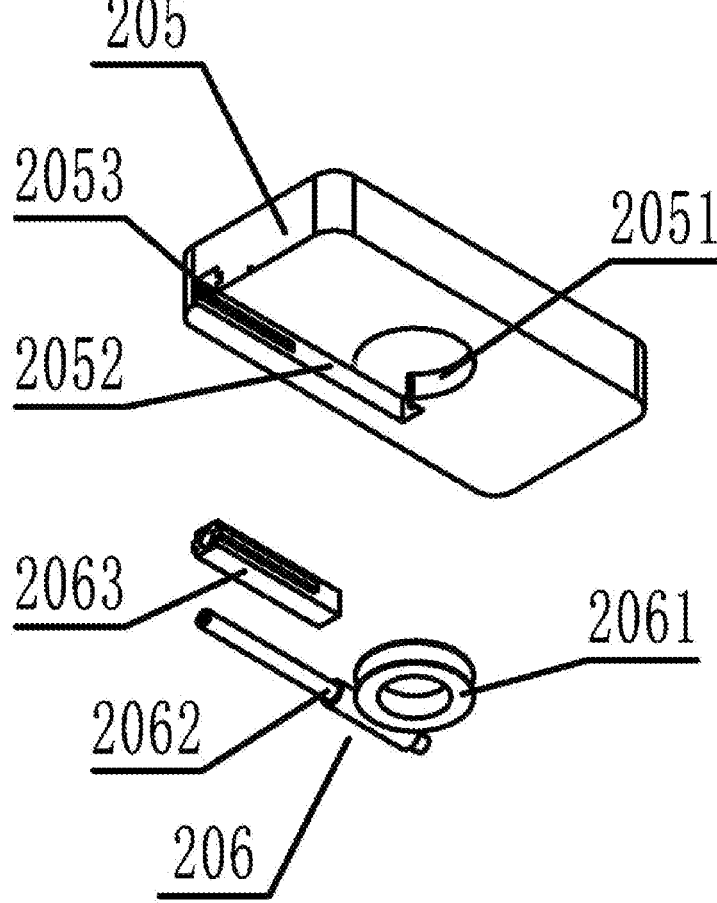
FIG. 5 is a schematic diagram of an exploded structure of a swing base assembly.
Figure 6:
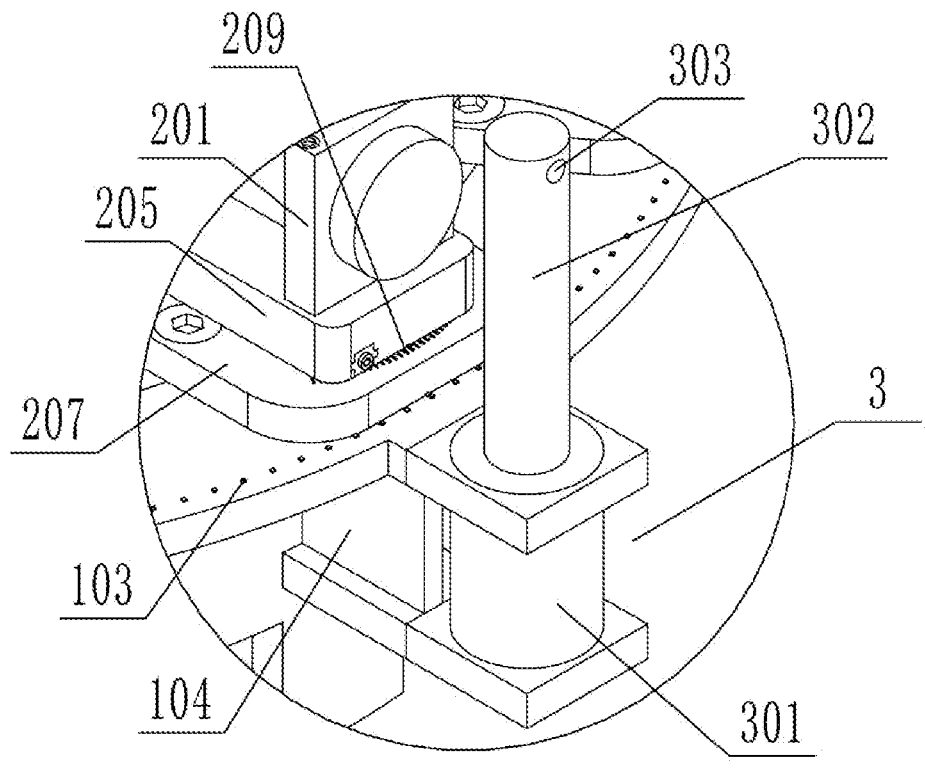
FIG. 6 is a partial enlarged schematic diagram of part A in FIG. 2.

As shown in FIG. 1 through FIG. 6, a test device for arbitrarily directional combined loading includes a test bench base assembly 1, and a loading assembly 2. A loading assembly 2 is arranged above the test bench base assembly 1. The loading assembly 2 includes a loading oil cylinder 201, the loading oil cylinder 201 is fixedly connected to a swing base 205 via loading fastening screws 204, and the swing base 205 is arranged on a loading base 207 and forms a relative rotation with respect to the loading base 207, such that the swing base 205 can rotate with respect to the loading base 207, and a direction of the loading oil cylinder 201 is adjusted to meet requirements of different loading angles. The test bench base assembly 1 includes a first chute 101, the loading base 207 is connected to the first chute 101 via a sliding fastening bolt 211, and the loading base 207 is slideable in the first chute 101 along with the loading base 207 in a case the first sliding fastening bolt 211 is not screwed tightly.

In order to further provide the use performance of the present disclosure, the loading assembly 2 further includes a loading rod 202, which is integrated with a piston of the loading oil cylinder 201. A sealing plug 203 is arranged between a port of the loading oil cylinder 201 and the loading rod 202, and hydraulic oil is injected into loading oil cylinder 201 to achieve the extension and retraction movement of the loading rod 202, thus applying a loading on a sample.

A swing assembly 206 is arranged between the swing base 205 and the loading base 207. The swing assembly 206 includes a worm gear 2061, and a worm 2062 meshed with the worm gear 2061 is arranged on one side of the worm gear 2061. The worm 2062 is rotationally connected to the swing base 205, and the center of the worm gear 2061 is provided with a swing shaft 208 which rotates synchronously. The swing shaft 208 is fixedly connected to the loading base 207 and rotationally connected to the swing base 205. The worm 2062 is rotated to enable the swing base 205 to rotate with respect to the loading base 207. The swing assembly 206 is in worm drive, and thus a situation that the swing base 205 and the loading base 207 are forced to rotate due to a tangential component force brought by the application of a non-centripetal load is avoided by using the unidirectionality of the worm drive.

A worm gear groove 2051 and a worm groove 2052 are arranged at the lower part of the swing base 205. The worm gear groove 2051 is arranged at the geometric center of the swing base 205 to ensure the stable placement of the swing base 205. The worm gear 2061 is placed in the worm gear groove 2051, and the worm 2062 is placed in the worm groove 2052.

A rear end of the worm 2062 is provided with a limit mounting block 2063 capable of rotating relatively with respect to the worm, and the limit mounting block 2063 is arranged in a limit groove 2053 and is of a profiled structure, so as to facilitate the mounting of the limit mounting block 2063 without falling and ensure that the worm 2062 can be conveniently mounted in the swing base 205 and rotate relatively with respect to the swing base.

A rear tail end of the worm 2062 is provided with a worm driving shank. In this embodiment, in order to save the space, the worm driving shank is an internal hexagon hole formed in a rear end face of the worm 2062, and the worm is driven to rotate via an internal hexagon wrench.

A swing seal 210 is arranged on an upper surface of the loading base 207 and concentric with the swing shaft 208. The swing base 205 is placed on the loading base 207 so as to auxiliary support and seal an internal rotating space.

A swing scale 209 is provided at a rear side part of the upper surface of the loading base 207 to measure a rotation angle of the swing base 205 with respect to the loading base 207, thereby achieving the purpose of accurate adjustment.

The test bench base assembly 1 is further provided with a second chute 102. The loading base 207 is connected to the second chute 102 via the sliding fastening bolt 211. The second chute 102 and the first chute 101 are both of an annular structure, and a diameter of the second chute 102 is larger than that of the first chute 101.

Two sliding fastening bolts 211 are arranged in the second chute 102 to connect to the loading base 207, one sliding fastening bolt 211 is arranged in the first chute 101 to connect the loading base 207, and the three sliding fastening bolts 211 form a triangular structure. The swing seal 210 is arranged inside the sliding fastening bolts 211 arranged in a triangular structure. The three sliding fastening bolts 211 can be screwed or unscrewed by rotating the swing base 205, the triangular structure is provided to improve the stability, and thus the whole loading assembly 2 can bear a larger reaction force of the loading load. Meanwhile, a space is reserved below the first chute 101 and the second chute 102 to facilitate an operation of screwing/unscrewing the sliding fastening bolts 211. In this embodiment, the sliding fastening bolts 211 are adopted, which can be connected by lower nuts, but, for convenience, the sliding fastening bolt can also be connected by an upper nut or an upward screw can be used. It should be noted that no matter whether the upper nut, the lower nut or the screw is used for connection, the rotation between the swing base 205 and the loading base 207 cannot be interfered.

Multiple loading assemblies 2 are arranged above the test bench base assembly 1 to perform a multi-direction and multi-angle loading test on a sample to be loaded. In this embodiment, ten loading assemblies 2 are provided, an annular scale 103 is provided on an upper surface of the test bench base assembly 1 and on the outer side of the second chute 102 to measure the position of each loading assembly 2 in an circumferential direction, thereby achieving the purpose of accurate adjustment.

A cover plate 4 is arranged above the loading assemblies 2, clamping assemblies 3 is arranged below the cover plate 4, a tightening base 104 is arranged on the outside surface of the test bench base assembly 1, and the clamping assemblies 3 are mounted on the tightening bases 104; the clamping assemblies 3 are used to drive the cover plate 4 to move up and down to clamp the loading assemblies 2, thus further increasing a reaction force of a larger loading load that the loading assemblies are able to bear.

The clamping assembly 3 includes a clamping oil cylinder 301, and a clamping rod 302. The clamping oil cylinder 301 is fixedly connected to the corresponding tightening base 104, the clamping rod 302 is fixedly connected to a piston of the clamping oil cylinder 301, such that hydraulic oil can be injected into the clamping oil cylinder 301 to drive the clamping rod 302 to extend and retract. An upper end of the clamping rod 302 is provided with a clamping pin hole 303, and a pin is inserted into the clamping pin hole 303 to make the clamping rod 302 integrated with the cover plate 4.

Multiple tightening bases 104 are arranged on the outside surface of the test bench base assembly 1, and each tightening base 104 is provided with the clamping assembly 3 to improve a clamping force of the clamping assembly 3 and the uniformity of the clamping force.

The center of the test bench base assembly 1 is provided with a lifting table 5, and a lifting oil cylinder 501 is arranged below the lifting table 5. The lifting oil cylinder 501 is used to drive the lifting table 5 to ascend and descend, thus playing a role of lifting and supplemental restraint on the sample to be loaded. A hydraulic oil pressure in the lifting table 5 can be set for the setting a restraint force for the sample to be loaded during the test. Meanwhile, the lifting oil cylinder 5 can be controlled by displacement, so as to ascend and descend to a designated position.

Meanwhile, the present disclosure further provides a use method of a test device for arbitrarily directional combined loading. The method includes the following steps.

Step 1: the number of loading assemblies 2 to be used is selected as required, three sliding fastening bolts 211 are unscrewed and adjusted to respective annular positions according to an annular scale 203, and then the three sliding fastening bolts 211 are locked. The loading assemblies 2 which do not need to be arranged can be moved to a non-interference position or the loading assemblies which do not need to be arranged can be removed.

Step 2: a hexagonal wrench is inserted into an internal hexagonal hole at a rear end of a worm 2062 to drive the worm 2062 to rotate, while the worm gear 2061 cannot rotate under the limitation of a swing shaft 208, such that the worm 2062 can drive the swing base 205 to rotate while rotating. The swing base 205 is adjusted to a required direction according to the swing scale 209, thus adjusting each of the selected loading assembly 2 needing to be used until the adjustment is completed.

Step 3: a sample to be loaded is placed into the device, a lifting oil cylinder 501 is started to lift the sample to an appropriate height to facilitate the loading of the sample. In this case, a respective supplemental restraint force for a lifting table 5 can be set as required, so as to restrain the deformation of the sample in a direction of the lifting table 5.

Step 4: clamping assemblies 3 are started to drive a cover plate 4 to move downwards, so as to clamp the loading assembly 2. During clamping, an appropriate clamping force needs to be set as required, so as to improve the ability of the loading assembly 2 to resist a reaction force of loading.

Step 5: the loading assemblies 2 are started to perform a loading test on the sample, and after the loading is completed, the clamping assemblies 3 are controlled to drive the cover plate 4 to move upwards, the loading oil cylinder 201 retracts, the loaded sample is taken out, and the lifting table 5 is lowered to complete the test operation.

The present disclosure and its embodiments have been described schematically above without limitation, what is shown in the accompanying drawings is also only one of the embodiments of the present disclosure, and the actual structure is not limited thereto. Therefore, all the structural modes and embodiments obtained by those of ordinary skill in the art similar to the technical solution of the present disclosure without creative efforts shall belong to the scope of protection of the present disclosure.

What is claimed is:

1. A test device for arbitrarily directional combined loading, comprising:
   a test bench base assembly, and
   a loading assembly,
   wherein the loading assembly is arranged above the test bench base assembly; the loading assembly comprises a loading oil cylinder which is fixedly connected to a swing base via loading fastening screws, and the swing base is arranged on a loading base and forms a relative rotation with respect to the loading base, such that the swing base is rotatable with respect to the loading base, and a direction of the loading oil cylinder is adjusted to meet requirements of different loading angles;
   wherein the test bench base assembly comprises a first chute, the loading base is connected to the first chute via a first sliding fastening bolt, and the first sliding fastening bolt is slideable in the first chute along with the loading base in a case the first sliding fastening bolt is not screwed tightly; and
   wherein the loading assembly further comprises a loading rod, the loading rod is integrated with a piston of the loading oil cylinder, a sealing plug is arranged between a port of the loading oil cylinder and the loading rod, and hydraulic oil is injected into the loading oil cylinder to enable the loading rod to extend and retract so as to apply a loading on a sample.

2. The test device according to claim 1, wherein a swing assembly is arranged between the swing base and the loading base, the swing assembly comprises a worm gear, a worm meshed with the worm gear is arranged on one side of the worm gear, the worm is rotationally connected to the swing base, a center of the worm gear is provided with a swing shaft which rotates synchronously, the swing shaft is fixedly connected to the loading base and rotationally connected to the swing base, the worm is rotated to enable the swing base to rotate with respect to the loading base; and
   wherein the swing assembly is a worm drive, and a situation that the swing base and the loading base are forced to rotate due to a tangential component force brought by an application of a non-centripetal load is avoided by using a unidirectionality of the worm drive.

3. The test device according to claim 2, wherein a lower part of the swing base is provided with a worm gear groove and a worm groove, the worm gear groove is arranged at a geometric center of the swing base to ensure that the swing base is placed stably, the worm gear is placed in the worm gear groove, and the worm is placed in the worm groove; and wherein a rear end of the worm is provided with a limit mounting block capable of rotating relatively with respect to the worm, and the limit mounting block is arranged in a limit groove and is of a profiled structure, so as to facilitate a mounting of the limit mounting block without falling and ensure that the worm is able to be conveniently mounted in the swing base and rotate relatively with respect to the swing base.

4. The test device according to claim 3, wherein a swing seal is arranged on an upper surface of the loading base and concentric with the swing shaft, and the swing base is placed on the loading base so as to auxiliary support and seal an internal rotating space; and wherein a swing scale is provided at a rear part of the upper surface of the loading base to measure a rotation angle of the swing base with respect to the loading base, so as to achieve a purpose of accurate adjustment.

5. The test device according to claim 4, wherein the test bench base assembly is further provided with a second chute, the loading base is connected to the second chute via second sliding fastening bolts, the second chute and the first chute are both of an annular structure, and a diameter of the second chute is larger than a diameter of the first chute.

6. The test device according to claim 5, wherein a number of the second sliding fastening bolts is two, the second chute is connected to the loading base by arranging the two second sliding fastening bolts in the second chute, the first chute is connected to the loading base by arranging the first sliding fastening bolt in the first chute, and the first sliding fastening bolt and the two second sliding fastening bolts form a triangular structure; and wherein the swing seal is arranged inside the triangular structure formed by the first sliding fastening bolt and the two second sliding fastening bolts, the first sliding fastening bolt and the two sliding fastening bolts is capable of being screwed or unscrewed by rotating the swing base, the triangular structure is provided to improve a stability, such that the loading assembly is capable of bearing a larger reaction force of a loading load, and a space is reserved below the first chute and the second chute to facilitate an operation of screwing/unscrewing the first sliding fastening bolt and the two sliding fastening bolts.

7. The test device according to claim 6, wherein the loading assembly comprises a plurality of loading assemblies which are arranged above the test bench base assembly to perform a multidirectional and multi-angle loading test on the sample to be loaded, and an annular scale is provided on an upper surface of the test bench base assembly and on an outer side of the second chute to measure a position of each of the plurality of the loading assemblies in a circumferential direction so as to achieve the purpose of accurate adjustment.

8. The test device according to claim 7, wherein a cover plate is arranged above the plurality of loading assemblies, clamping assemblies are arranged below the cover plate, tightening bases are arranged on an outside surface of the test bench base assembly, and the clamping assemblies are mounted on the tightening bases; the clamping assemblies are used to drive the cover plate to move up and down to clamp the plurality of loading assemblies so as to further increase a reaction force of a larger loading load that the plurality of loading assemblies are able to bear; and wherein each of the clamping assemblies comprises a clamping oil cylinder and a clamping rod, the clamping oil cylinder is fixedly connected to a corresponding one of the tightening bases; the clamping rod is fixedly connected to a piston of the clamping oil cylinder, an upper end of the clamping rod is provided with a clamping pin hole, and a pin is inserted into the clamping pin hole to make the clamping rod integrated with the cover plate; a clamping force of the clamping assemblies and a uniformity of the clamping force are improved by mounting the each of the clamping assemblies on the corresponding one of the tightening bases.

9. The test device according to claim 8, wherein a center of the test bench base assembly is provided with a lifting table, and a lifting oil cylinder is arranged below the lifting table; the lifting oil cylinder is used to drive the lifting table to ascend and descend so as to lift and supplementally restrain the sample to be loaded; and a hydraulic oil pressure in the lifting table is set to adjust a restraint force for the sample to be loaded during the test; and the lifting oil cylinder is controlled by displacement, so as to ascend and descend to a designated position.

10. A method for using a test device for arbitrarily directional combined loading according to claim 9, comprising:

selecting a number of the loading assemblies to be used as required, unscrewing the first sliding fastening bolt and the two second sliding fastening bolts, adjusting the first sliding fastening bolt and the two second sliding fastening bolts to respective annular positions according to the annular scale, and then locking the first sliding fastening bolt and the two second sliding fastening bolts, moving the loading assemblies which do not need to be arranged to a non-interference position or removing the loading assemblies which do not need to be arranged;

inserting the hexagonal wrench into an internal hexagonal hole formed in the rear end face of the worm to drive the worm to rotate, enabling the worm gear not to rotate under a limitation of the swing shaft; enabling the worm to drive the swing base to rotate while rotating, and adjusting the swing base to a required direction according to the swing scale, thus adjusting each of the selected loading assemblies which to be used until the adjusting is completed;

placing the sample to be loaded, starting the lifting oil cylinder, and lifting the sample to an appropriate height to facilitate loading; setting a respective supplemental restraint force for the lifting table as required, and restraining a deformation of the sample in a direction of the lifting table;

starting the clamping assemblies to drive the cover plate to move downwards for clamping the loading assemblies, setting an appropriate clamping force as required during the clamping, so as to improve the ability of the loading assemblies to resist a reaction force of loading; and starting the loading assemblies to perform the loading test on the sample, after the loading is completed, controlling the clamping assemblies to drive the cover plate to move upwards, retracting the loading oil cylinder, taking out the loaded sample, and lowering the lifting table to complete a test operation.

\* \* \* \* \*